Figure 1:
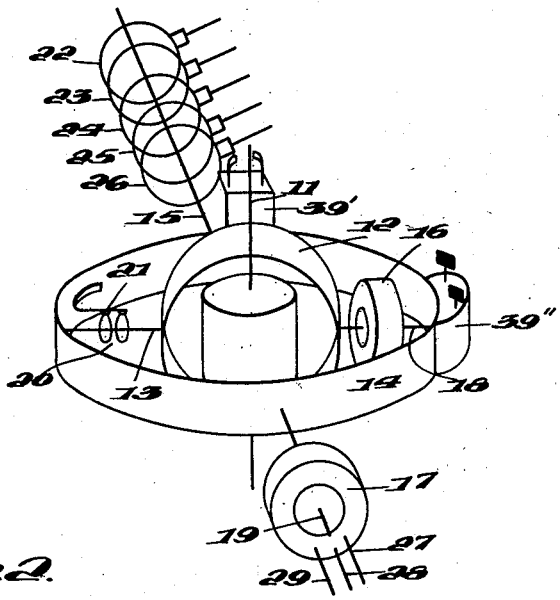

Dec. 31, 1957   CARL-ERIK GRANQVIST   2,817,975
PENDULUM CONTROL ARRANGEMENT FOR GYROSCOPES
Filed Dec. 7, 1953

INVENTOR
CARL-ERIK GRANQVIST,
BY Larson and Taylor
ATTORNEYS

United States Patent Office 2,817,975
Patented Dec. 31, 1957

2,817,975

PENDULUM CONTROL ARRANGEMENT FOR GYROSCOPES

Carl-Erik Granqvist, Lidingo, Sweden

Application December 7, 1953, Serial No. 396,691

Claims priority, application Sweden October 26, 1953

5 Claims. (Cl. 74—5.47)

It has been a controversial issue with regard to several types of navigation, particularly air navigation, whether to employ gyroscopes or pendulums for the indication of the space coordinates. Both systems have advantages as well as drawbacks. Pendulums are sensitive to acceleration and centrifugal forces and may exhibit large errors in the indication during aerobatic manoeuvres but adjust themselves automatically and quickly in a vertical direction under the influence of gravity as soon as the airplane has returned to horizontal flight. Gyroscopes are practically insensitive to acceleration and centrifugal forces but errors may occur in their orientation for other reasons, particularly in aerobatic manoeuvres when it may occur temporarily without attracting the attention of the pilot that two of the gyroscope shafts coincide. In such case a coupling occurs beween the shafts and that shaft which should not take up any rotation may be caused by the coupling to take up part of the rotation, resulting in an angular error in both this shaft and the shaft that should have taken up all of the rotation but did take-up only a part of it. Owing to the large rotational mass of the gyroscope such an error is eliminated very slowly.

It has therefore been proposed to use pendulums in association with gyroscopes in such a way as to enjoy the advantages of both systems and incur as little as possible of the disadvantages.

In arrangements of this type the gyroscope serves as the navigation instrument proper on account of its greater precision. The pendulum, however, is intended to exert an automatic control on the gyroscope so as to become operative immediately upon an error in the position of the gyroscope and correct the position thereof.

A difficulty has arisen in arrangements of this type because, as was mentioned above, the pendulum is influenced by accelerations and by centrifugal forces and if the gyroscope is not to be brought from a correct to an incorrect position through the action of the pendulum care must be taken to prevent the pendulum from fulfilling its corrective function other than at rest on the ground or during actually straight horizontal flight.

The invention refers to an arrangement for the aforesaid purpose. It is irrelevant to the invention whether the gyroscope is of the direct-indicating type or if it is a so called "central" gyroscope, in which the gimbal movements are translated by remote control to the indicating instrument. The invention will therefore be described below in connection with a direct-indicating gyroscope and the indicating means thereof will not be described, since it is well-known to one skilled in the art how they are to be arranged. The invention is also applicable to the same extent in other types of gyroscopes. The gyroscope, as usual, comprises a rotor which is set in rotation at a very high speed. The rotor is suspended in an inner gimbal frame and this is in its turn suspended in the outer gimbal frame. The rotor shaft is vertical and the shaft connecting the inner and outer gimbal frames as well as that between the outer frame and the structure of the craft are horizontal and mutually perpendicular. Preferably the one of these shafts is in the longitudinal direction of the craft and the other one at right angles to this direction.

According to the invention a reversible servomotor is inserted in each of the gimbal shafts, the current for the motor being applied by means of contact means mounted on the gimbal frames when these contact means make contact with a corresponding pendulum.

This arrangement as well as further details of the invention will be apparent from the following description with reference to the accompanying drawings, which illustrate an embodiment of the invention. In the drawings, Fig. 1 shows schematically a gyroscope suspended in two gimbal frames as well as the contact means and the servomotors and Fig. 2 shows a detailed circuit diagram of one of the servomotors and the corresponding contacts.

Figure 2:
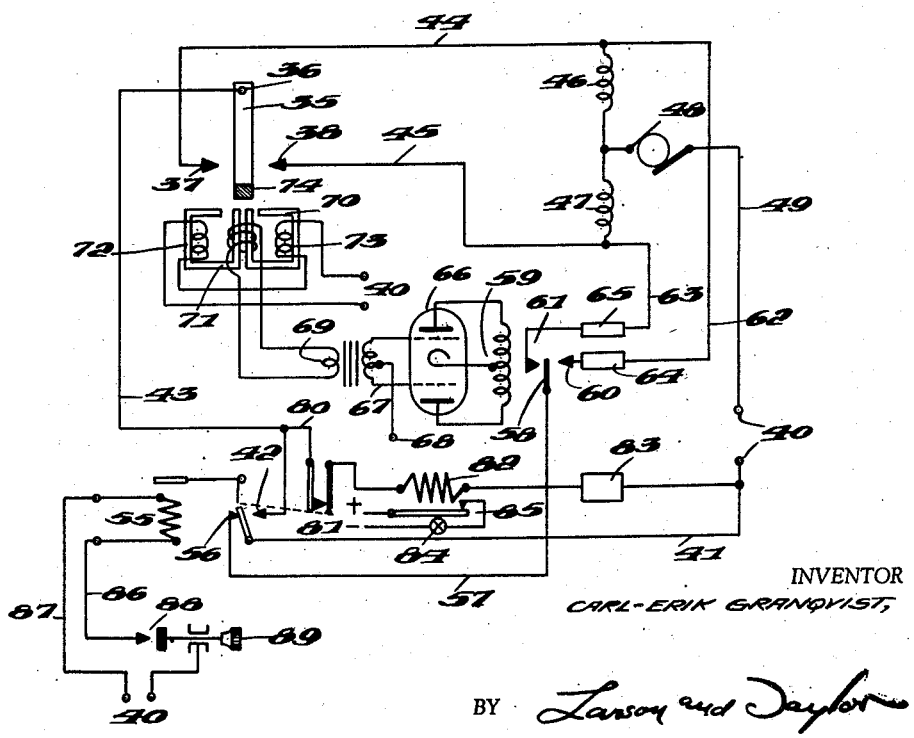

The gyroscope rotor is designated 10 in Fig. 1. It is irrelevant to the invention how the rotor is made to turn. Briefly, however, the two commonest methods of causing rotation of the rotor are to provide a stator with a three-phase winding connected to a three-phase current source so as to set up a rapidly rotating field or to arrange minor angular recesses in the rotor, which act somewhat similarly to turbine blades in association with a pair of nozzles. The rotor is rotatable on its shaft 11, which is journalled in the inner gimbal ring 12. The latter is then journalled by means of a horizontal shaft 13 in the outer gimbal ring 14. The ring 14, finally, is journalled by means of a shaft 15 in the craft in which the gyroscope is mounted.

A servomotor is inserted in each of the gimbal shafts and is able to cause a rotation of the corresponding shaft so as to eliminate a possible error occurring in the position of the gyroscope. The servomotor inserted between the inner and the outer gimbal ring is designated 16 and that inserted between the outer gimbal ring and the craft structure is designated 17. Direct current is applied in the customary way to the servomotor armature windings, the motors being provided each with a pair of oppositely wound field windings so that it is possible by switching one or the other of the field windings into operation to make the motor turn in a corresponding direction. Obviously, the invention is not restricted to this particular kind of reversible motor, but any type of reversible motor may be used. The type just referred to is therefore to be regarded only as an example of the possibilities available.

In the Fig. 1 arrangement the armature windings are connected to the inner part of the motor, which is attached to the left-hand part of the shaft 13, i. e. the part carrying the inner gimbal ring 12, the field winding being supported by the outer part of the motor, that is to say by the part of the shaft 18 illustrated at the right. In a corresponding manner, the armature winding of the motor 17 is supported by the inner part of the motor, which is mounted on a shaft portion carrying the outer gimbal ring 14, and the field windings are mounted on the outer part of the motor, which is supported in its turn by the shaft end 19, journalled in the craft structure.

It is apparent from the above that two conductors are required for the inner part of the servomotor 16 and these conductors are connected with a pair of slip rings 20 arranged on the shaft 13 and cooperating with brushes 21 carried by the outer gimbal ring 14. A conductor leads from one of the brushes to a slip ring 22 mounted on the shaft 15 and cooperating with a brush supported on the craft structure. The other conductor runs along the outer gimbal ring to the field winding in the outer part of the motor 16, where it is connected to the junction point between the two windings. The remote ends of these windings are connected by means of a pair of conductors with a pair of additional slip rings 23 and 24 comprised in the set of slip rings mounted on the shaft of the outer gimbal ring 14. The two remaining slip rings 25 and 26 are connected with the winding on the inner part of the servomotor 19. The connection to the outer part of this motor is mounted entirely on the fixed parts of the structure so that it is not visible in Fig. 1. The three conductors have been designated in Fig. 1 by numbers 27, 28 and 29.

Fig. 2 illustrates the relay pendulum for controlling the function of the servomotors 16 or 17. It is to be noted that it is preferable to have two pendulums of this kind and that in such case each of them should be able to swing in a plane at right angles to that of the other. It is true that it may be sufficient under certain conditions in uncomplicated arrangements to use only one relay pendulum, since the excursion thereof is dependent upon an error in the position of one of the gimbal shafts and any such error will cause through the gyro coupling a corresponding error in the other gimbal shaft, so that if one of the errors is eliminated by a servomotor, the error in the position of the remaining shaft will be automatically corrected through the gyro coupling. However, it is preferable to provide two pendulum devices for influencing directly one each of the two servomotors. In fact, this gives substantial advantages, among which may be mentioned, that the total power required for the correction is distributed between the two motors, so that a quicker correction of the incurred error is possible. Further, if for some reason or other one of the motors or its control devices should fail, the other motor with its controls is enough to eliminate the error. Also, it may happen exceptionally that the error of one gimbal shaft does not correspond exactly to that of the other shaft, in which case the minor error would remain if only one servomotor is used.

Since the two circuit arrangements are identical, it will be enough for the purpose of this application to describe only one of them.

In Fig. 2 the pendulum is designated as 35. It is suspended freely so as to be turnable about a horizontal axis 36, and normally is in a position between a pair of contacts 37 and 38. The contacts are provided in order to indicate whether the corresponding gimbal ring is in a position in which its shaft is horizontal, which should be the case when the gyroscope is functioning correctly. The corresponding contacts are supported by a contact support 39' or 39", respectively, mounted on the gimbal ring 12 or 14, respectively.

40 designates a voltage source for driving the servomotors 16 and 17. It may suitably comprise an alternating current source of comparatively high frequency, such as 400 c./s. The voltage is applied through a conductor 41 from one pole of the source 40 via a relay contact 42, the function of which will be described below, and via an additional conductor 43 to the pendulum, to which the voltage is applied through the journalling thereof. The contacts 37 and 38 are connected through corresponding conductors 44 and 45, respectively, to the field windings 46 and 47, respectively, of the corresponding servomotor and the junction point of the field windings is connected to the armature winding 48 of the servomotor, from which a conductor 49 connects with the other pole of the voltage source.

It appears from the above that the circuits described can only be closed when the relay contact 42 is closed. The contact 42 belongs to a relay 55, which is inserted in the starting circuit of the gyro system in such a way as to make the relay 55 attract instantly when the system is put into operation, whereby the contact 42 is then closed. For this purpose the winding of the relay is connected by means of conductors 86 and 87 with the source of alternating voltage 40. In the conductor 86, a contact 88 is inserted which is closed when the manually operated pushbutton 89 is pressed. The relay 55 is delayed in its action so that it remains attracted during a certain interval irrespective of whether the starting circuit is interrupted or not. In this interval the system operates as follows:

It is to be assumed that when the gyro system has been out of operation, the gimbal rings may be in practically any position. For instance, the gimbal ring connected with the circuits of Fig. 2 may deviate from the horizontal position of its shaft in such a way that contact occurs between the pendulum and the contact 37. This closes a circuit from one pole of the voltage supply through the conductor 41, the contact 42, the conductor 43, the pendulum 35, the contact 37, the conductor 44, the field winding 46, the armature winding 48 and the conductor 49 to the other pole of the supply. The motor then begins to rotate so as to turn the corresponding gimbal shaft to a position in which the contact between the pendulum 35 and the contact 37 is broken. During this adjustment, however, the gyroscope rotor is starting up and its speed is being successively accelerated. Full gyroscope effect is not yet present and it is therefore possible that the shaft, being still somewhat unstable, turns back into a position in which there is contact between the pendulum 35 and the contact 37. However, the shaft may also turn in the opposite direction, so that contact is made between the pendulum 35 and the other contact 38. In any case, the closing of a contact causes a corresponding circuit for the servomotor to close, whereby current is applied to the field winding whose energization causes rotation of the motor in a direction tending to eliminate the error in the shaft position.

The gap between the pendulum and the contact 37 or the contact 38 may be made very small, for instance of the order of 1°. This makes it possible to attain correct space orientation of the gyroscope during the starting interval thereof, so that the otherwise customary stabilizing interval, which could be reckoned at about 5 or 10 minutes, until the gimbal rings of the gyroscope had assumed their correct positions in level flight, is not required. The energization time of the relay 55 is so chosen that the gyroscope may be assumed to have attained full speed and thus also full inherent stabilizing action when the relay 55 is released. The current supply is then removed from the contact 42, the conductor 43 and the pendulum 35 and the before described adjusting arrangement is made inoperative. Instead, another control arrangement is made operative.

The contact 56 of the relay 55 is connected with a conductor 57, which connects with a contact 58 of a polarized relay 59. The two contacts cooperating with the contact spring 58 are designated 60 and 61 and are connected via corresponding conductors 62 and 63, respectively, in which comparatively large resistances 64 and 65, respectively, are inserted, with the outer terminals of the field windings 46 and 47, respectively. The polarized relay 59 is provided with two oppositely poled windings, which are connected together at one end. This junction is connected with the cathode of a dual triode 66 and the other two ends of the windings of the relay 59 are connected each to one of the anodes of the tube 66. An anode voltage source is inserted at a suitable point of this circuit, for instance in the conductor leading from the junction point of the windings to the cathode of the tube 66. The control grids of the tube 66 are connected in a corresponding manner with the free ends of a winding 67, which has a mid point tap 68. The tap is connected with the cathode of the tube 66 via some suitable grid bias source. The winding 67 forms the secondary of a transformer, whose primary 69 is connected with the middle leg of a three-legged transformer 70, which is provided with a winding 71. The two outer legs of the transformer 70 have each one winding 72 or 73, respectively. These windings are connected in series with the source 40 of alternating current used to drive the adjusting device.

The transformer 70 has very small air gaps between the middle leg on the one hand and each of the side legs on the other. Into the area of the magnetic field of this air gap extends the lower part 74 of the pendulum 35, which is made of very soft iron.

This arrangement operates in the following manner:

As long as the two gimbal rings of the gyroscope are horizontal, the iron part 74 is suspended directly above the middle leg of the transformer 70 and therefore has a symmetric effect on the field of the two air gaps, i. e. the air gap between the middle leg and the side leg 72 as well as that between the middle leg and the side leg 73. The windings 72 and 73 are wound in such way that the entire field of the transformer 70 passes through the outer legs, whereas there is no difference field passing through the middle leg. The winding 71 therefore has no voltage induced in it and symmetrical voltages are supplied to the tube 66 so that also the voltages applied to the differential relay 59 are symmetrical and neither of its contacts is closed.

Let it be assumed now, however, that a manoeuvre has been performed resulting in a gyroscopic error, i. e. that one (or both) of the gimbal shafts has been brought into an inclined position with regard to the horizontal plane. The result of this is that the iron part 74 of the pendulum has approached one of the air gaps and partially bridged it, whereas it has been removed from the other air gap. The dissymmetry in the transformer 70 will then lead to the induction of a voltage in the winding 71 of the middle leg. The direction of this voltage will depend upon which air gap has the smaller or the higher magnetic resistance. Consequently, the voltage will have a certain direction if the pendulum has moved to the right and the opposite direction if the pendulum has moved to the left, as viewed in the figure. The voltage of the winding 71 is applied with opposed phases to the grids of the tube 66 and consequently one anode current, with which the grid voltage is in phase, will increase, and the other, with which the grid voltage has opposite phase, will decrease. The relay 59 is therefore attracted. The direction of the relay movement will then be unequivocally determined by the direction in which the pendulum 35 has moved.

Upon attraction of the relay 59 as referred to above, a circuit is closed through one of the contacts 60 and 61, namely the one causing a rotation of the servomotor tending to eliminate the error in the position of the corresponding gimbal shaft. This circuit may comprise the conductor 41, the contact 56, the conductor 57, the contact 58 and the contact 60, the resistor 64 and the conductor 62, the field winding 46, the armature winding 48 and the conductor 49 as well as the terminal 40. Owing to the rotation of the motor thus caused the existing error is eliminated.

It is to be noted that a reduced current is applied to the motor under the conditions referred to, the resistor 64 being inserted in the motor circuit. The purpose of this is to avoid excessive control action by the motor, since we are only concerned with very small adjustments of the gimbal shafts. The pendulum arrangement in combination with the three-legged transformer 70 forms a very sensitive instrument and there is no difficulty in making sufficient current available for the relay 59 to be energized even at a position error of only 1° of the pendulum with regard to the contacts 37 and 38. Correction of this error requires only a very small movement of the motor.

It was mentioned above that the commonest cause of error in the position of the gimbal shafts is the temporary coincidence or parallelism that may occur during an aerobatic manoeuvre, during which a coupling may occur, through which a shaft that should not properly take up any rotation is made to take up a more or less appreciable part of the rotation of the other shaft. This may lead to very large angular errors and it is possible that the arrangement just described is not adequate for the purpose. To indicate this, the arrangement has been so chosen that the two air gaps are very close together and are very narrow. Already for quite small excursions of the pendulum, which, however, exceed the excursions that lead to a correction and may amount to ±5°, for instance, the iron part 74 of the pendulum will be entirely outside the magnetic fields of the air gaps and the pendulum will therefore be inoperative. For this purpose the contacts 37 and 38 are resilient.

From the conductor 43 a conductor 80 branches off to a contact of the relay 55. This contact, designated 81, is arranged to be normally closed but to be broken upon attraction of the relay 55. The contact 81 has connected in series with it a relay winding 82 of a time relay, the series circuit comprising also a large resistor 83. The resistor 83 is large enough to reduce the current passing through the circuit to a value that is too low to cause rotation of the motor 46—48. The relay 82 is arranged to attract after a predetermined interval, such as 60 seconds. It then closes its contact 85, which causes some suitable signal arrangement to operate. This arrangement may be of any suitable kind but has been illustrated in the drawing in the form of a lamp 84.

It is obvious that if the pilot has put his plane into an aerobatic manoeuvre, which might lead to major gyroscopic errors, every incipent error will immediately cause the tube 66 to be controlled so as to cause correction of the error by means of the servomotor 46—48. However, if the error should increase at a higher rate than that at which the servomotor is able to correct it, a condition will soon be reached, in which the iron part of the pendulum is outside the magnetic field of the air gaps of the transformer 70. The incurred error is not now corrected, which causes the warning lamp to be ignited at the end of the 60 seconds interval so as to indicate to the pilot that he should return to level flight as soon as possible and set the time relay 55 in operation again to adjust the position of the gyroscope in the same way as when it was initially started.

Now it is possible that upon the pilot's returning the plane to level flight the signal lamp 84 is immediately extinguished. This proves that the gyroscope was actually in correct position and that the signal lamp was ignited because the pendulum had reacted on some force other than gravity, for instance an accelerating or retarding force or a centrifugal force. These forces are of such a nature that they very rapidly cause a very large pendulum excursion and the limitation of the influence of the pendulum on the magnetic field of the air gaps of the transformer 70 has been provided in order to prevent excursions of the pendulum caused by such extraneous forces from causing a correction of the gimbal shafts of the gyroscope, since such correction might be equivalent to a correction for an apparent error, when in reality an error is instead actually introduced.

The invention is obviously not limited to the particular embodiment thereof described and illustrated in the drawing but is capable of various modifications within the spirit and scope of the invention.

What is claimed is:

1. Arrangement for controlling the position of the gimbal shafts of a gyroscope in response to the position of at least one pendulum, the axis of the oscillation of which is normally parallel to the direction of the horizontal shaft of a gimbal ring, the position of which is to be controlled, said arrangement comprising, at least one servomotor connected to rotate said shaft, contact relay means, manually operable switching means to make said contact relay means actuable to correct for large errors, as well as electromagnetic relay means actuable to correct only for small areas, said contact relay means and electromagnetic relay means being connected to control said servomotor to cause a rotation tending to eliminate said error.

2. Arrangement as claimed in claim 1, in which a time relay is actuable manually to effect switching in of the contact relay means to function instead of the electromagnetic relay means during a predetermined time.

3. Arrangement as claimed in claim 2, in which resistors are inserted in the servomotor circuits when controlled by the said electromagnetic relay means.

4. Arrangement as claimed in claim 3, in which the electromagnetic relay means comprises a three-legged transformer, the side legs of which have primary windings having voltages applied thereto and the middle leg of which is provided with a secondary winding, the pendulum being arranged in its normal position to be symmetrically placed over the middle leg so as to alter through small excursion thereof in either direction the balance of the transformer by influencing the field of the corresponding air gap and to have no influence on the transformer field if the excursion exceeds a predetermined larger value.

5. Arrangement as claimed in claim 4, in which the portion of the pendulum adjacent the transformer is formed of soft iron.

References Cited in the file of this patent

UNITED STATES PATENTS

| | | |
|---|---|---|
| 2,418,032 | Jewell | Mar. 25, 1947 |
| 2,531,826 | Reichel | Nov. 28, 1950 |
| 2,608,099 | Roush | Aug. 26, 1952 |
| 2,716,894 | Nichols et al. | Sept. 6, 1955 |

FOREIGN PATENTS

| | | |
|---|---|---|
| 597,282 | Great Britain | Jan. 22, 1948 |